Oct. 20, 1964 E. S. BADURA 3,153,258
COUNTERBALANCING HINGE ASSEMBLY
Original Filed Feb. 11, 1960 3 Sheets-Sheet 1

INVENTOR.
Edmund S. Badura
BY
J. L. Carpenter
ATTORNEY

Oct. 20, 1964  E. S. BADURA  3,153,258
COUNTERBALANCING HINGE ASSEMBLY
Original Filed Feb. 11, 1960  3 Sheets-Sheet 2
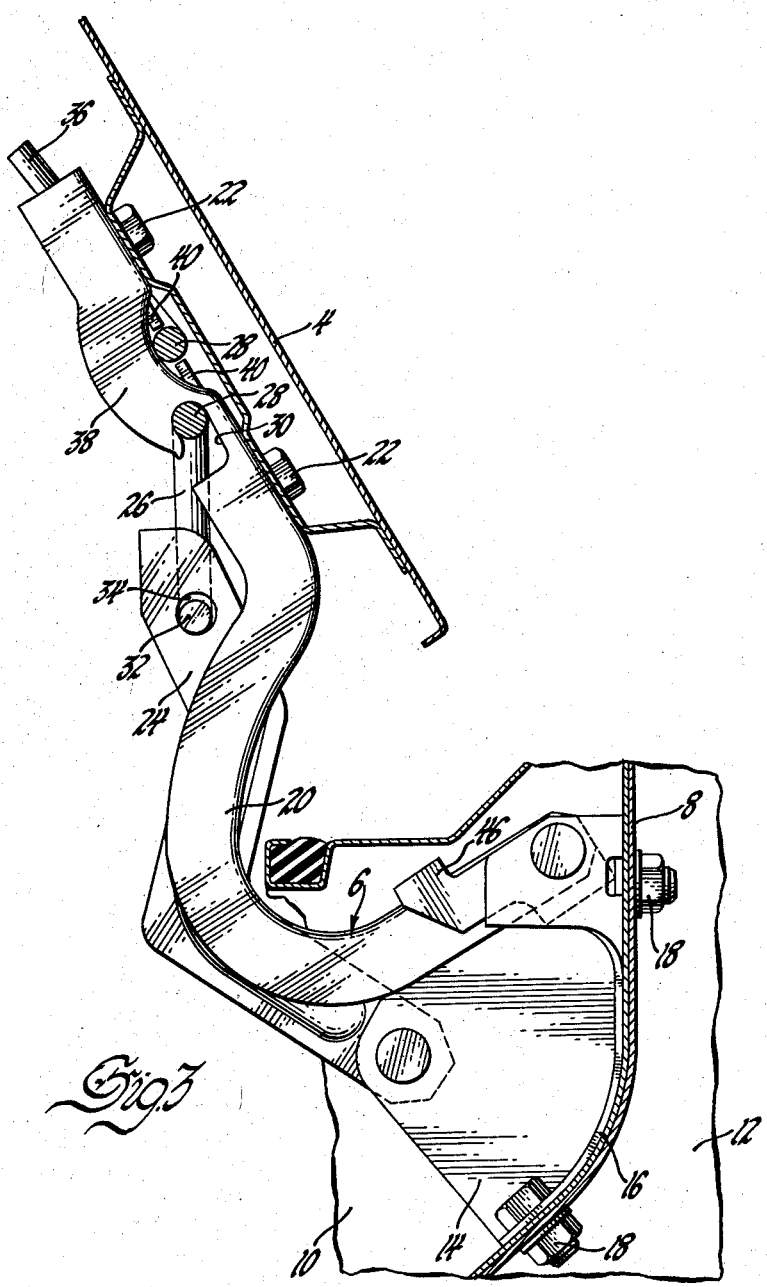
INVENTOR.
Edmund S. Badura
BY
J. L. Carpenter
ATTORNEY Oct. 20, 1964 E. S. BADURA 3,153,258
COUNTERBALANCING HINGE ASSEMBLY
Original Filed Feb. 11, 1960 3 Sheets-Sheet 3
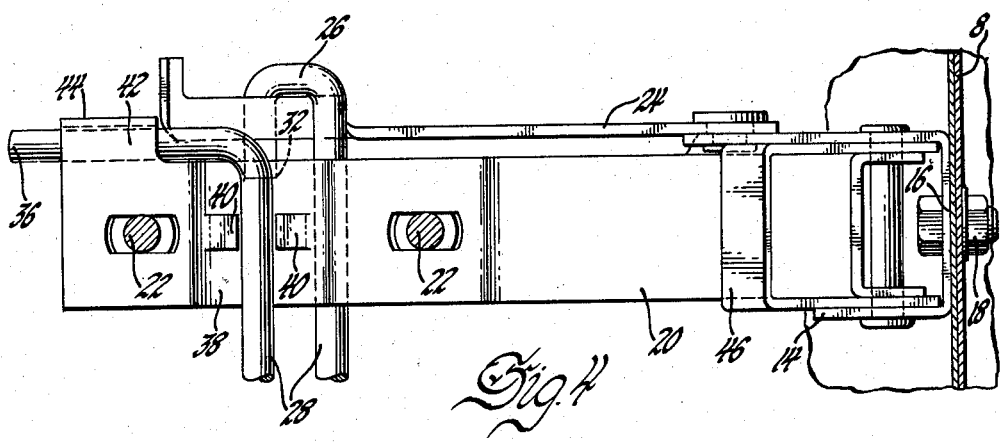
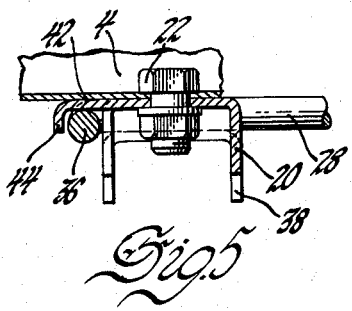
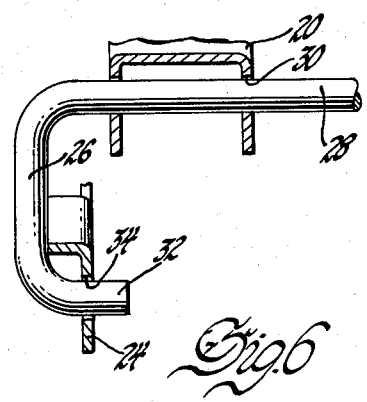
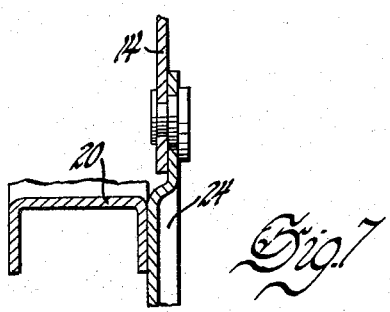
INVENTOR.
Edmund S. Badura
BY
J. L. Carpenter
ATTORNEY ved Oct. 20, 1964

3,153,258
COUNTERBALANCING HINGE ASSEMBLY
Edmund S. Badura, Detroit, Mich., assignor to General Motors Corporation, Detroit, Mich., a corporation of Delaware
Continuation of application Ser. No. 8,005, Feb. 11, 1960. This application Mar. 28, 1962, Ser. No. 185,494
5 Claims. (Cl. 16—128.1)

This invention relates generally to hinges and more particularly to hinges of the counterbalanced type particularly adapted to be used on automotive hoods or deck lids. The instant application is a continuation of United States patent application Serial No. 8,005 filed February 11, 1960, to be abandoned.

Torsion bars have been used to counterbalance hinge assemblies of the type indicated for some time and have been most commonly applied to the rear compartment deck lids of automotive vehicles. In such installations, however, the torsion bars have been generally mounted in a stationary manner within the luggage compartment immediately behind the rear seat and just below and in front of the deck lid. This is a convenient location since there is usually adequate room. They are also not readily visible when the deck lid is raised and the luggage compartment is open. There is, however, no similar location or space normally provided immediately behind the hood of automotive vehicles since the fire wall in almost all cases extends at least up to the rear edge of the hood and sometimes in front of it. Also, in certain types of automotive vehicles, such as convertibles and station wagons, there is insufficient room immediately beneath the rear compartment deck lid or in front of it for storing the torsion bars used to counterbalance the hinge assembly.

In accordance with the invention, the advantages of torsion bar counterbalancing are obtained in applications where there is not room for mounting the counterbalancing torsion rods on the stationary part of the vehicle. This is accomplished by installing such torsion bars on the moving parts of the hinge assembly and utilizing a crank portion of each rod as one link in a quadrilateral hinge linkage so formed as to fold together in a compact manner as the hinge assembly is moved to an open position.

For a further understanding of the above and other objects, advantages and features of this invention, reference may be had to the accompanying detailed description taken in conjunction with the accompanying drawings, in which:

FIGURE 3 is a view similar to FIGURE 2 except that the hinge assembly is shown in an opened position.

FIGURE 4 is a fragmentary view taken substantially in the plane of the line 4—4 of FIGURE 2 and shows the manner in which the torsion bars are journaled in and attached to a gooseneck hinge member, and also the manner of attaching the gooseneck hinge member to the stationary part of the fire wall of the vehicle.

FIGURE 5 is a fragmentary view taken substantially in the plane of the line 5—5 of FIGURE 2 with parts broken away and in section and showing in further detail the manner in which one end of the torsion bar is anchored to one of the swinging members of the hinge assembly.

FIGURE 6 is a view taken on the line 6—6 of FIGURE 2 and shows how a crank end of one torsion bar extends and forms a link between two swinging arms of the quadrilateral hinge linkage.

FIGURE 7 is a view taken on the line 7—7 of FIGURE 2 and illustrates the manner of connecting the second swinging arm of the hinge assembly to the stationary portion of the hinge linkage.

Figure 1:
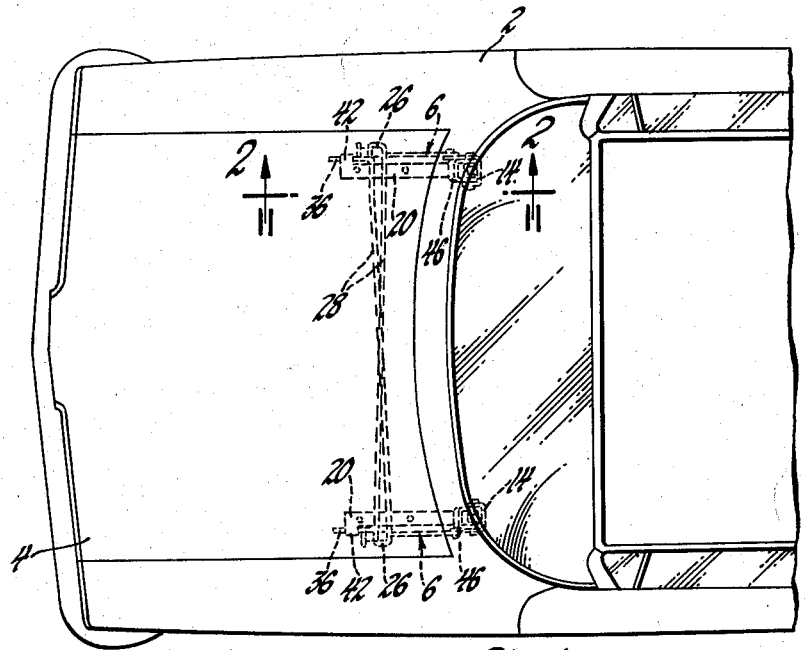
FIGURE 1 is a top elevational view of a portion of an automotive vehicle and shows a pair of hinge assemblies constructed in accordance with the invention installed on the vehicle and swingingly connecting the hood of the vehicle to the body portion thereof.
Figure 2:
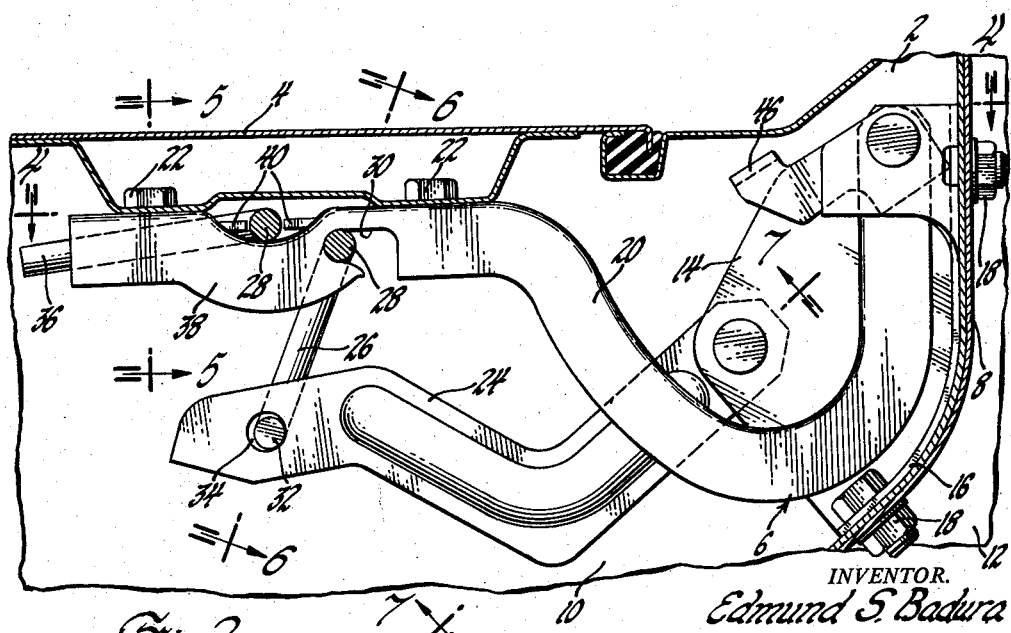
FIGURE 2 is a somewhat enlarged sectional view taken substantially in the plane of the line 2—2 of FIGURE 1 illustrating the counterbalanced hinge assembly in side elevation when in its closed position.

Referring now to the drawings and particularly to FIGURES 1 and 2, an automotive vehicle is indicated by the reference numeral 2. The vehicle has an engine compartment 10 closed by a hood 4 hinged to the vehicle body by a pair of transversely or laterally disposed hinge assemblies indicated generally at 6. These hinge assemblies are substantially identical. However, since one constitutes a left-hand hinge and the other a right-hand hinge, certain of the parts must be necessarily of reversed configuration. Thus the following descrpition of one of these hinge assemblies 6 accordingly applies to both.

As best seen in FIGURES 2 and 3, the vehicle 2 has a fire wall 8 which separates the engine compartment 10 from the passenger compartment 12. Each hinge assembly 6 includes a stationary bracket member 14 having a web 16 suitably bolted at 18 to the fire wall 8. A gooseneck hinge member 20 is pivotally supported at one end between the spaced clevis arms of each bracket 14. Each gooseneck member 20 swings vertically of its mounting bracket and constitutes one swinging arm of its respective hinge assembly. The swinging arms of the gooseneck members are suitably bolted at 22 as shown to the swinging closure member, in this case, the engine compartment hood 4. A second swinging arm or link member 24 is also pivotally secured to each bracket 14, as particularly shown in FIGURE 7, to swing vertically about an axis parallel to and spaced below the pivotal axis of the adjacent gooseneck hinge member. The swinging arm members 20 and 24 are interconnected at their free ends by a link 26 which actually constitutes a crank arm provided at one end of a counterbalancing torsion bar 28. The torsion bar 28 extends transversely of the vehicle and is journaled immediately adjacent the link or crank arm 26 in a slot or recess 30 formed in the adjacent swinging gooseneck hinge member 20. The outer end 32 of the crank arm 26 is turned so that it extends parallel to the main part of bar 28 and engages a hole 34 provided in the free end of swinging arm 24 (see particularly FIGURES 2, 3 and 6). As best seen in FIGURE 2, the swinging arm 24 extends from the bracket member 14 in substantially parallel spaced relation to the hood mounting gooseneck hinge member in their hood-closed positions.

As shown in FIGURE 1, each torsion bar 28 extends transversely of the vehicle below the hood 4 and has its end opposite the crank arm 26 anchored to the hood by the gooseneck member of the opposite hinge assembly in the manner shown in FIGURES 4 and 5. The anchoring parts for the counterbalancing torsion bar of the quadrilateral hinge assembly shown in FIGURES 2-4 are of course reversed from those shown in FIGURES 4 and 5. In the illustrative embodiment, the anchored end of the torsion bar extends immediately above a dropped portion 38 provided in the corresponding gooseneck hinge member 20 and between a pair of confining tabs or tongues 40 stamped out of the metal of the hinge member. An outer end portion 36 is turned normal to the main portion of the torsion bar to form a second crank arm which engages the underside of a tab 42 formed transversely of the free end of the hinge member 20. As shown, the tab 42 may be formed with downwardly extending flange 44 to restrict transverse movement of the torsion bar 28.

The counterbalancing torsion bars of the hinge assemblies 6 thus extend in opposite directions transversely of the vehicle beneath the engine compartment hood. Each has one crank arm end 36 anchored to the hood in the afore-described manner and is journaled with respect to the hood adjacent its opposite end which forms a crank arm link 26 connecting a swinging arm 24 to the associated gooseneck hinge member 20.

Assuming the hood to be closed so that the parts of the hinge assembly are shown in FIGURE 2, the links or crank arm 26 and the anchored crank ends 36 which are at right angles to the main part of the torsion bars 28 form acute angles approximately as shown between the link or crank arm 26 and the adjacent crank end 36 of the other of the torsion bar 28. When the link 26 and the end 36 of the bar are in the position indicated, the torsional loading applied to the main portion of the bar 28 tends to cause these arms to turn in opposite directions toward their positions shown in FIGURE 3. The torsion bars 28 thus act between the hood or the anchoring hinge members 20 and the swinging arms 24 and tend to bias the hood toward the counterbalance full-opened position shown in FIGURE 3. Closure of the hood, of course, again increases the torsional bias of each bar so that the hood upon release tends to move up to or to be at least counterbalanced. Movement of the hinge assembly in the opening direction is limited by the stop 46 being engaged by gooseneck 20.

From the foregoing description it may now be appreciated that the torsional bars 28 of the counterbalancing hinge assemblies are located in a relatively inconspicuous location and also move with the hinge assembly so that they are out of the way when the hood is opened to thereby make it easier to look into or work in the engine compartment. It will be further observed and appreciated that the parts are so formed and so assembled as to naturally fold together in a compact manner when the hinge assembly is moved to an open position. It should be emphasized that this invention is capable of many applications and there is no intent to limit its use to automotive vehicles and the like or to closure members.

I claim:

1. A counterbalanced hinge assembly for a closure member swingable between opened and closed positions comprising a pair of fixed supporting members, a pair of hinge members adapted to be secured to the closure member and pivotally connected to said fixed supporting members to swing the closure member between its opened and closed positions about a first axis, a link pivotally connected at one end to one of said fixed supporting members for swinging movement about a second axis parallel to and spaced from said first axis, said link extending in closely spaced relation to the adjacent hinge member when in their closed positions, a torsion bar rotatably supported adjacent one end by said adjacent hinge member and having a crank extending therefrom to the free end of said link and pivotally connected thereto, and means for anchoring the other end of said torsion bar to the other of said hinge members in a manner to increase the torsional bias of said torsion bar upon closing movement of said members, and said torsion bar acting between said members and tending to counterbalance the closure member within the limits of movement of said hinge members.

2. A counterbalanced hinge assembly for mounting a closure member for swinging movement between opened and closed positions comprising a fixed support member, a hinge member adapted to be secured to the closure member and pivotally connected to said fixed member to swing the closure member between its opened and closed positions about a first axis, a link member pivotally connected at one end to said fixed member for swinging movement about a second axis parallel to and spaced from said first axis, said link member extending in closely spaced substantially parallel relation to the hinge and closure members when in their closed positions, a torsion bar rotatably supported adjacent one end thereof by said hinge member, said one end having a crank extending to the free end of said link member and pivotally connected thereto, the other end of said torsion bar having a second crank, means for anchoring the other crank end of said torsion bar for movement with said closure member in a manner to increase the torsional bias of said bar upon closing, and said torsion bar being torsionally preloaded and acting between said members to counterbalance the closure member within the limits of opening movement permitted said hinge members.

3. A hinge structure for mounting a closure member on a fixed support member for swinging movement between opened and closed positions, a hinge member adapted to be secured to the closure member and pivotally connected to the fixed member to swing the closure member between its opened and closed positions about a first axis, a link member pivotally connected at one end to the fixed member about a second axis parallel to and spaced from said first axis, a torsion bar rotatably supported adjacent one end thereof by said hinge member, said one end having a crank arm extending to the free end of said link member and pivotally connected thereto, the other end of said torsion bar having a second crank arm, means for anchoring the second crank arm of said torsion bar for movement with said closure member in a manner to increase the torsional loading of said torsion bar upon closing movement of said members, and said torsion bar acting between said members to counterbalance the closure member between its opened and closed positions.

4. Hinge structure for mounting a closure member for counterbalanced swinging movement between opened and closed positions comprising a pair of fixed support members, a pair of hinge members adapted to be secured to the closure member and pivotally connected to said fixed members to swing the closure member between its opened and closed positions about a first axis, a link member pivotally connected at one end to one of said fixed members for swinging movement about a second axis parallel to and spaced from said first axis, said link member extending in spaced relation to the adjacent hinge member connected to said one fixed member, a torsion bar rotatably supported adjacent opposite ends thereof by said hinge members and extending therebetween in spaced relation to said first pivotal axis, one end of said torsion bar having a first crank arm extending from said adjacent hinge and pivotally connected to the free end of said link member, the other end of said torsion bar having a second crank arm extending outwardly of the other of said hinge members and anchored for movement with said hinge and closure members in a manner to maintain a torsional bias on said torsion bar acting through the hinge and link members connected thereto to counterbalance the closure member within the limits of opening movement of said hinge members.

5. Hinge structure for mounting a closure member for counterbalanced swinging movement between opened and closed positions comprising a pair of fixed support members, a pair of hinge members adapted to be secured to the closure member and pivotally connected to said fixed members to swing the closure member between its opened and closed positions about a first axis, a pair of link members pivotally connected to said fixed members for swinging movement about a second axis parallel to and spaced from said first axis, said link members each extending in spaced relation to the adjacent hinge member, a pair of torsion bars rotatably supported adjacent opposite ends thereof by said hinge members and extending therebetween in spaced relation to said first pivotal axis, said torsion bars each having a first crank arm end portion extending from the adjacent hinge and pivotally connected to the free end of the adjacent link member, the other ends of said torsion bars each having a second crank arm end portion extending outwardly of its supporting hinge member and anchored thereby for movement with said closure member in a manner to maintain and increase the torsional preloading of said torsion bar with closing movement of said hinge and closure members, the torsional loading of said torsion bar acting through the crank arms and the hinge and link members connected thereto and tending to counterbalance the closure member within the limits of opening movement of said hinge members.

References Cited in the file of this patent

UNITED STATES PATENTS

| | | |
|---|---|---|
| 2,707,799 | Butterfield | May 10, 1955 |
| 2,799,891 | Ragsdale | July 23, 1957 |
| 2,871,505 | Clark et al. | Feb. 3, 1959 |
| 2,894,277 | Bogater et al. | July 14, 1959 |
| 2,984,517 | Farrow et al. | May 16, 1961 |